United States Patent [19]
Mullins

[11] Patent Number: 6,044,316
[45] Date of Patent: Mar. 28, 2000

[54] METHOD AND APPARATUS FOR NAVIGATING A REMOTELY GUIDED BRUSH CUTTING, CHIPPING AND CLEARING APPARATUS

[76] Inventor: Donald B. Mullins, 36921 Tumbleweed, Simonton, Tex. 77476

[21] Appl. No.: 08/840,340

[22] Filed: Apr. 28, 1997

Related U.S. Application Data

[63] Continuation-in-part of application No. 08/366,626, Dec. 30, 1994, Pat. No. 5,666,792.

[51] Int. Cl.⁷ .......................... G06F 165/00; A01D 41/00
[52] U.S. Cl. .................... 701/50; 56/10.2 A; 701/215; 340/995
[58] Field of Search .................... 701/2, 23, 26, 701/50, 213, 215, 300; 56/10.2 A, 10.2 R, 10.5, DIG. 7; 342/357, 457; 340/988, 995

[56] References Cited

U.S. PATENT DOCUMENTS

| | | | |
|---|---|---|---|
| 4,180,964 | 1/1980 | Panshire | 56/10.2 A |
| 4,244,123 | 1/1981 | Lazure et al. | 37/348 |
| 4,318,266 | 3/1982 | Taube | 56/10.2 |
| 4,482,960 | 11/1984 | Pryor | 364/424 |
| 4,532,757 | 8/1985 | Tutle | 56/328 |
| 4,888,890 | 12/1989 | Studebaker et al. | 37/348 |
| 4,912,643 | 3/1990 | Beirxe | 702/150 |
| 4,967,362 | 10/1990 | Schutten et al. | 701/50 |
| 4,978,246 | 12/1990 | Quenzi et al. | 404/84 |
| 4,994,970 | 2/1991 | Noji et al. | 701/25 |
| 5,100,229 | 3/1992 | Lundberg et al. | 356/3.12 |
| 5,155,490 | 10/1992 | Spradley, Jr. et al. | 342/357 |
| 5,182,566 | 1/1993 | Ferguson et al. | 342/357 |
| 5,220,876 | 6/1993 | Monson et al. | 111/130 |
| 5,375,663 | 12/1994 | Teach | 172/4.5 |
| 5,438,817 | 8/1995 | Nakamura | 56/10.2 A |
| 5,666,792 | 9/1997 | Mullins | 56/10.2 A |

*Primary Examiner*—William A. Cuchlinski, Jr.
*Assistant Examiner*—Edward Pipala
*Attorney, Agent, or Firm*—David M. O'Brian

[57] ABSTRACT

A method and apparatus for navigating a remotely guided brush cutting, chipping and clearing apparatus, dependent upon remote positioning data and radio communication signals, having an apparatus locator system for determining the location of the apparatus and a guidance system for navigating and maintaining the apparatus in a desired direction of travel along a particular line of travel and for traversing a plurality of specific data points along the particular line of travel, relative to the surface of the earth.

17 Claims, 9 Drawing Sheets

METHOD AND APPARATUS FOR NAVIGATING A REMOTELY GUIDED BRUSH CUTTING, CHIPPING AND CLEARING APPARATUS

CROSS REFERENCE TO RELATED APPLICATION

The present application is a continuation-in-part of the application of Donald B. Mullins, U.S. Ser. No. 08/366,626, filed on Dec. 30, 1994, now U.S. Pat. No. 5,666,792, entitled REMOTELY GUIDED BRUSH CUTTING, CHIPPING AND CLEARING APPARATUS AND METHOD, still pending.

FIELD OF THE INVENTION

The present invention relates generally to a method and apparatus for navigating a vehicle. Specifically, the present invention relates to a method and apparatus for navigating a remotely guided brush cutting, chipping and clearing apparatus, dependent upon remote positioning data, having a locator system for determining a location of the apparatus and a guidance system to achieve and maintain a desired direction of travel, including a method for navigating a specific line of travel and a plurality of particular points along the line of travel, by the apparatus, relative to the surface of the earth.

BACKGROUND OF THE INVENTION

The ability to quickly and accurately navigate through and traverse over lightly to moderately wooded and/or thicketed terrain, along particular points of a specific line of travel, without the assistance of conventional land-based survey techniques and crew, and in the absence of permanently damaging the land, is of significant importance. Presently it is a difficult task to clear small to moderate sized brush consisting of small trees having diameters of up to 5 inches, thick briar patches, overgrown vines, grasses and weeds, all in an effort to accurately locate and travel a desired line of travel and a plurality of specific points along that line. Often, the desired path or line of travel may, for example, include property lines, seismic lines, rights-of-way and the like. Even where the survey coordinates, longitude and latitude coordinates or other types of location data are known for the specific property line, seismic line or right-of-way, brush and overgrown vegetation present significant barriers to physically locating these pathways. Various types of soil damaging equipment such as bulldozers, road scrapers and other types of heavy equipment may be used to knock down and push aside brush, however the soil damage incurred to the land generally outweighs the benefit of using this type of equipment. In the past, the location and clearing of property lines, seismic lines, rights-of-way and the like, in lightly to moderately wooded and/or thicketed areas has generally required a surveyor and a lead survey crew to begin at a known location and slowly and methodically hand cut its path and measure the appropriate distance in the desired direction to locate property lines, seismic lines, rights-of-way and the like, while a brush clearing crew and/or a brush clearing device follow behind the surveyor. Although this procedure for identifying property lines, seismic lines, rights-of-way and the like is generally accurate, it is nonetheless, very slow, labor intensive and expensive.

It would be of great benefit to not only be able to quickly and accurately navigate through and traverse over lightly to moderately wooded and thicketed terrain, but, at the same time to be able to locate a desired direction of travel and a plurality of specific points along the line of travel, and clear a pathway through the wooded and thicketed areas to provide easy access for motorized and/or foot traffic through said pathway.

Heretofore, there have been no methods of navigating which integrate an apparatus locator system, an apparatus guidance system, and a navigation system, with a brush cutting, chipping and clearing apparatus, which provides for navigating a remotely guided brush cutting, chipping and clearing apparatus over property lines, seismic lines, rights-of-way and the like, while clearing a pathway for motorized and/or foot traffic, without the need for traditional survey procedures. For the apparatus locator system to be effective throughout the world, it would need to be dependent on a satellite guidance system. One apparatus locator system may include, for example, communications equipment which could receive signals from the Global Positioning System (GPS) satellite network. A detailed explanation of the Global Positioning System is set forth in U.S. Pat. No. 5,155,490, GEODETIC SURVEYING SYSTEM USING MULTIPLE GPS BASE STATIONS, issued to Spradley, Jr. et al. The GPS satellite network comprises 24 satellites which produce positioning signals and provide for the calculation of distance measurements. A minimum of three GPS satellite signals are necessary to determine any position on the earth. The GPS satellite signals can be received by one or more base stations, located at various positions on the earth's surface, and by a GPS antenna which may be mounted to the apparatus. The base station may receive and interpret the GPS satellite signals, however the base station produces a differential correction signal for use with the GPS satellite signals. The base station in turn sends the differential correction signal to a communication satellite which conveys the differential correction signal to a radio antenna mounted to the apparatus, or alternatively, the radio antenna may receive the differential correction signal directly from the base station. Additionally, a dual purpose antenna can receive both the GPS satellite signals and the differential correction signal from the base station. The differential correction signal and the GPS satellite signals can be simultaneously interpreted by the guidance system, wherein the differential correction is applied to calculate the current position of the vehicle from the GPS satellite signals. The corrected position and location of the apparatus, with respect to the earth and the desired direction of travel, can then both be displayed by the guidance system, in selectively either a graphic manner or a digital manner. An operator, stationed on board the apparatus or remotely stationed from the apparatus but having access to the guidance system, could view the guidance system and in response thereto maneuver the apparatus to cut, chip and clear small to moderately sized brush while traveling in a desired direction, i.e. over property lines, seismic lines, rights-of-way and the like. The GPS satellite signals provide very accurate guidance information where they can be received and where the positioning signal can be conveyed to the receiver antenna. However, in thickly forested areas or other areas having dense overhead or "canopy" cover, the GPS satellite signals may not always be effectively received. Thus the need arises for alternate apparatus locator systems which can be used in areas having canopy cover. An alternate apparatus locator system which may be used in areas having canopy cover may include, for example, an automated or semi-automated geodetic survey system, independent of guidance satellite signals. One such semi-automated geodetic survey system, may, for instance comprise the Geodimeter® System 4000. The Geodimeter® System 4000 is an automated survey system consisting of a transportable station unit positioned at a known point and a mobile reflector, generally mounted to a transportable carrier or vehicle. The station unit continuously conveys laser signals to the reflector, as the reflector moves away from the station unit. The laser signals are then reflected back to the station unit and measurement data is collected by a guidance system which may for example be a control unit or data processor which may be affixed adjacent to the reflector. The laser signals are processed at the station unit and a radio signal is sent to the guidance system. The radio signal is processed by and displayed by the guidance system, thus informing the operator as to the present location of the apparatus and the desired direction of travel.

Therefore, a need exists for a method of navigating a remotely guided brush cutting, chipping and clearing apparatus having a locator system for determining the location of the apparatus and a guidance system for determining the desired direction of travel for the apparatus and for navigating along specific points of a particular line of travel, relative to the surface of the earth. Additionally, a need exists for a method of logging or recording the points traversed by the apparatus, of the line of travel, relative to the surface of the earth.

Although the need for such a device and method of navigating has been long felt, the prior art, heretofore, has not provided such a device or method which meet all of the aforementioned criterion.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features and advantages in accordance with the purpose of the invention as embodied and broadly described herein, a method for navigating a remotely guided brush cutting, chipping and clearing apparatus, dependent upon remote positioning data and radio communication signals, is presented to quickly and accurately navigate through and traverse over lightly to moderately wooded and thicketed terrain, along specific points of a particular line of travel, while at the same time clearing a pathway through the wooded and thicketed areas to provide passage for motorized and/or foot traffic through said pathway. The present invention provides a preferred embodiment method for remotely guiding a brush cutting, chipping and clearing apparatus consisting of a vehicle; a cutting head mounted to said vehicle for cutting, chipping and clearing brush; an apparatus locator system mounted to the vehicle for to determine the location of the apparatus with respect to the surface of the earth which receives the remote positioning data and radio communication signals; and a guidance system in signal communication with the apparatus locator system to process the remote positioning data and radio communication signals to navigate the apparatus in a desired direction of travel. The cutting head preferably includes a plurality of pivotal, U-shaped, throw-out knives mounted to a rotatable, horizontal shaft and a drive means for rotating the horizontal shaft. The guidance system may for example be a data processor and a navigation system, wherein the data processor includes a central processing unit and display unit for processing the remote positioning data, the radio communication signals and the survey coordinates of a desired or pre-determined direction of travel, including, for example, the survey coordinates for property lines, seismic lines, rights-of-way and the like. The guidance system may also include a video display screen for displaying to an operator the processed data, including the current position of the apparatus relative to the surface of the earth, and the desired direction of travel for the apparatus. The apparatus locator system may include, for instance, a GPS signal processing unit and one or more satellite/radio communication antenna or, alternatively a dual purpose antenna for receiving a plurality of remote positioning data signals produced from a guidance satellite system. The satellite/radio communication antenna or dual purpose antenna may also receive a differential correction signal generated from a base station. The base station may, for example, be a conventional GPS base station. The base station may also be in communication with the remote positioning data signals produced by the guidance satellite system. The one or more satellite/radio communication antenna is preferably mounted to the vehicle and connected to a GPS signal processing unit via a first coaxial communication link. The GPS signal processing unit is also preferably in direct communication with the guidance system via a second coaxial communication link. The guidance satellite system may include any of the public access satellite systems, such as, for example the Coast Guard satellite guidance system. The guidance satellite system may also include any commercial or private satellite systems, such as for instance, the Omni-Star satellite guidance system. The base station may, for example, be a Coast Guard operated facility or may be privately operated, wherein users pay for the differential correction signal broadcast.

Alternatively, the apparatus locator system may include communication equipment in communication with an automated or semi-automated geodetic survey system. The alternate embodiment apparatus locator system may include for example a first communication antenna mounted to the apparatus. The geodetic survey system may further include, for example, a station unit and a reflector. The reflector is typically mounted to the apparatus or some other object which generally moves away from the station unit. The station unit may transmit a continuous laser signal or other type of signal to the reflector, wherein the reflector returns the signal back to the station unit. The station unit processes the reflected laser signal and, in response thereto, produces and transmits remote positioning data in the form of a radio signal to the guidance system. The guidance system may, for instance, be a data processor or control unit having a central processing unit and a visual display, which is mounted on the apparatus. The radio signal generated from the station unit contains location and positioning information regarding the reflector which is mounted to the apparatus. The guidance system processes the radio signal, determines the location of the apparatus, displays the location of the apparatus and the desired direction of travel for the apparatus.

The present invention includes a method for remotely guiding a brush cutting, chipping and clearing apparatus, dependent upon remote positioning data and radio communication signals, the method preferably includes the steps of: receiving by an apparatus locator system, the remote positioning data and radio communication signals; conveying the remote positioning data and radio communication signals from the apparatus locator system to a guidance system; processing and displaying by the guidance system, the remote positioning data and radio communication signals transmitted from the apparatus locator system; interpreting, by an operator, the data processed by the guidance system to determine a current location of the apparatus with respect to the surface of the earth; and maneuvering of the apparatus by the operator, to guide the apparatus in a desired direction of travel.

Additionally, the present invention includes a method of navigating a vehicle, preferably comprising a remotely guided brush cutting, chipping and clearing apparatus, dependent upon remote positioning data and radio communication signals, along specific data points of a particular line of travel, and includes the steps of: engaging a data processor and navigation system, mounted on the vehicle, wherein the data processor includes a video data display and is in communication with the remote positioning data and radio communication signals; selecting on the data processor and navigation system, a particular line of travel along which to navigate the vehicle; inputting in to the data processor and navigation system, a starting line of travel, a specific starting point on the particular starting line of travel from which to begin navigating the vehicle, a specific ending point on the particular starting line of travel and a plurality of data points on the starting line of travel between the specific starting point and the specific ending point; selecting from the data processor, a visual display format from which an operator of the vehicle can interpret the instantaneous position of the vehicle, a particular line of travel and a plurality of specific data points, in relation to the surface of the earth and thereafter control the navigation of the vehicle; navigating the vehicle along the plurality of data points on the particular line of travel; and selectively providing for the input of additional lines of travel and additional specific data points along the additional lines of travel, to allow the vehicle to navigate a plurality of lines of travel.

BRIEF DESCRIPTION OF THE DRAWINGS

The accompanying drawings which are incorporated into and constitute a part of this specification, illustrate a preferred embodiment of the invention and together with a general description of the invention given above and the detailed description of the preferred embodiment given below serve to explain the principals of the invention.

The above general description and the following detailed description are merely illustrative of the generic invention and additional modes, advantages and particulars will be readily suggested to those skilled in the art without departing from the spirit and the scope of the invention.

DETAILED DESCRIPTION OF THE INVENTION

Figure 1:
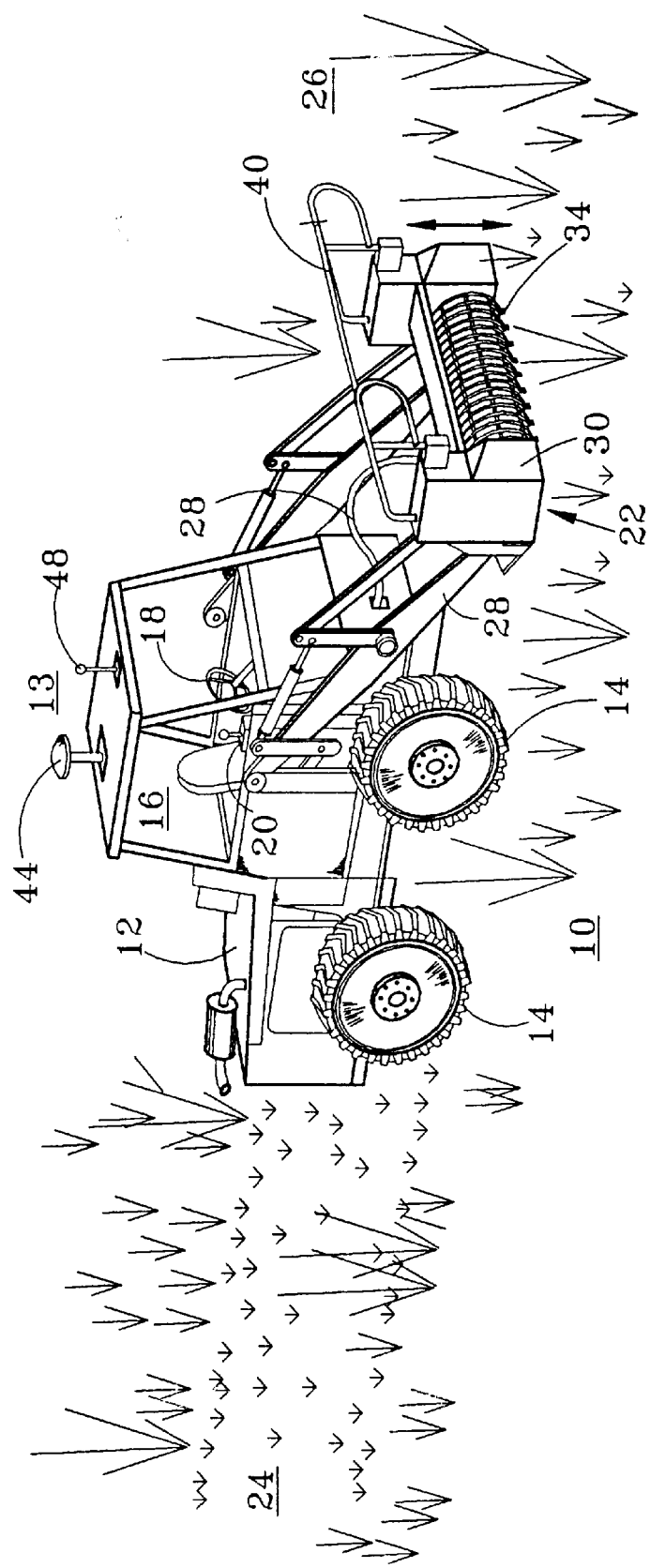
FIG. 1 is a perspective view of a remotely guided brush cutting, chipping and clearing apparatus embodying the concepts of the present invention.

With reference to the drawings wherein like parts are designated by like numerals, FIG. 1 illustrates a perspective view of a preferred embodiment remotely guided brush cutting, chipping and clearing apparatus 10, which is dependent upon remote positioning data and radio communication signals, as defined by the present invention. The remotely guided brush cutting, chipping and clearing apparatus 10 preferably includes a vehicle 12; having three or more wheels 14; a cab 16 for accommodating an operator (not shown), a steering control means 18 for controllably maneuvering the vehicle 12, a power control means 20; and a cutting or cutter head 22 mounted to the vehicle 12 for cutting, chipping and clearing a pathway or particular line of travel 24 through an area of small to moderately sized brush 26. The cutter head 22 is mounted to the vehicle 12 via a hydraulic support system 28 which selectively raises and lowers the height of the cutter head 22. The cutter head 22 includes a housing 30 within which is secured a rotatable, horizontal shaft 32. The hydraulic support system 28 also provides rotational drive power for the horizontal shaft 32.

Figure 2A:
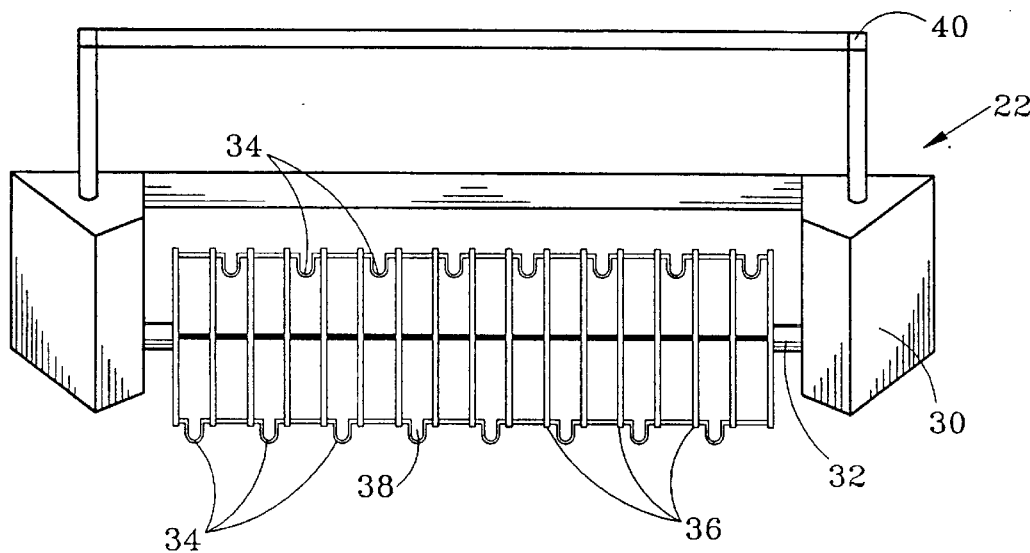
FIG. 2A is a front view of a preferred embodiment cutting head of the present invention shown in FIG. 1.
Figure 2B:
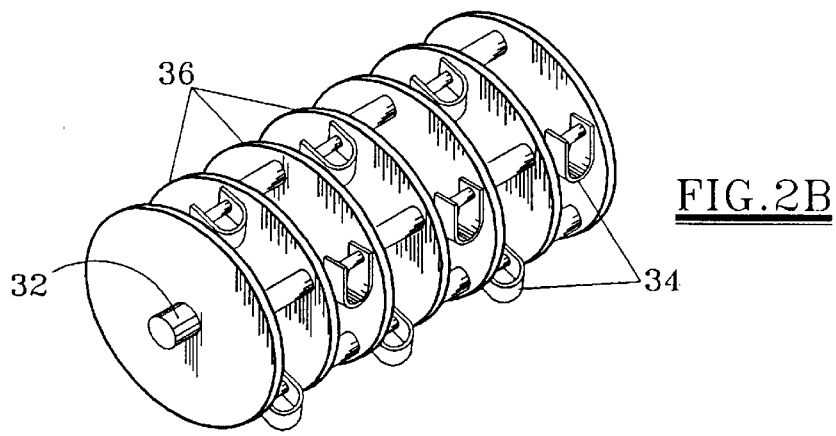
FIG. 2B is a partial cut-away, perspective view of the cutting head shown in FIG. 2A.

With reference to FIGS. 1, 2A and 2B, a plurality of U-shaped throw-out knives 34 are shown mounted to a peripheral edge of a plurality of mounting discs 36. The mounting discs 36 are laterally mounted on and rotated by the rotatable, horizontal shaft 32. The plurality of throw-out knives 34 are pivotally affixed to a plurality of mounting discs 36 such that when the shaft 32 is rotated at high revolutions per minute, such as, for example, 60 rpm, the throw-out knives 34 pivot outward from the mounting discs 36 to extend a "trough" portion 38 having a very sharp edge, wherein the sharp edged trough portions 38 cut, chip and clear the brush 26. Additionally, the preferred embodiment cutter head 22 includes one or more bumpers 40 which facilitate the feeding of small to medium sized brush 26 into the cutter head 22 and the bumpers 40 also serve to protect the cutting head 22 from unintentional contact with non-brush related material (not shown).

Figure 3:
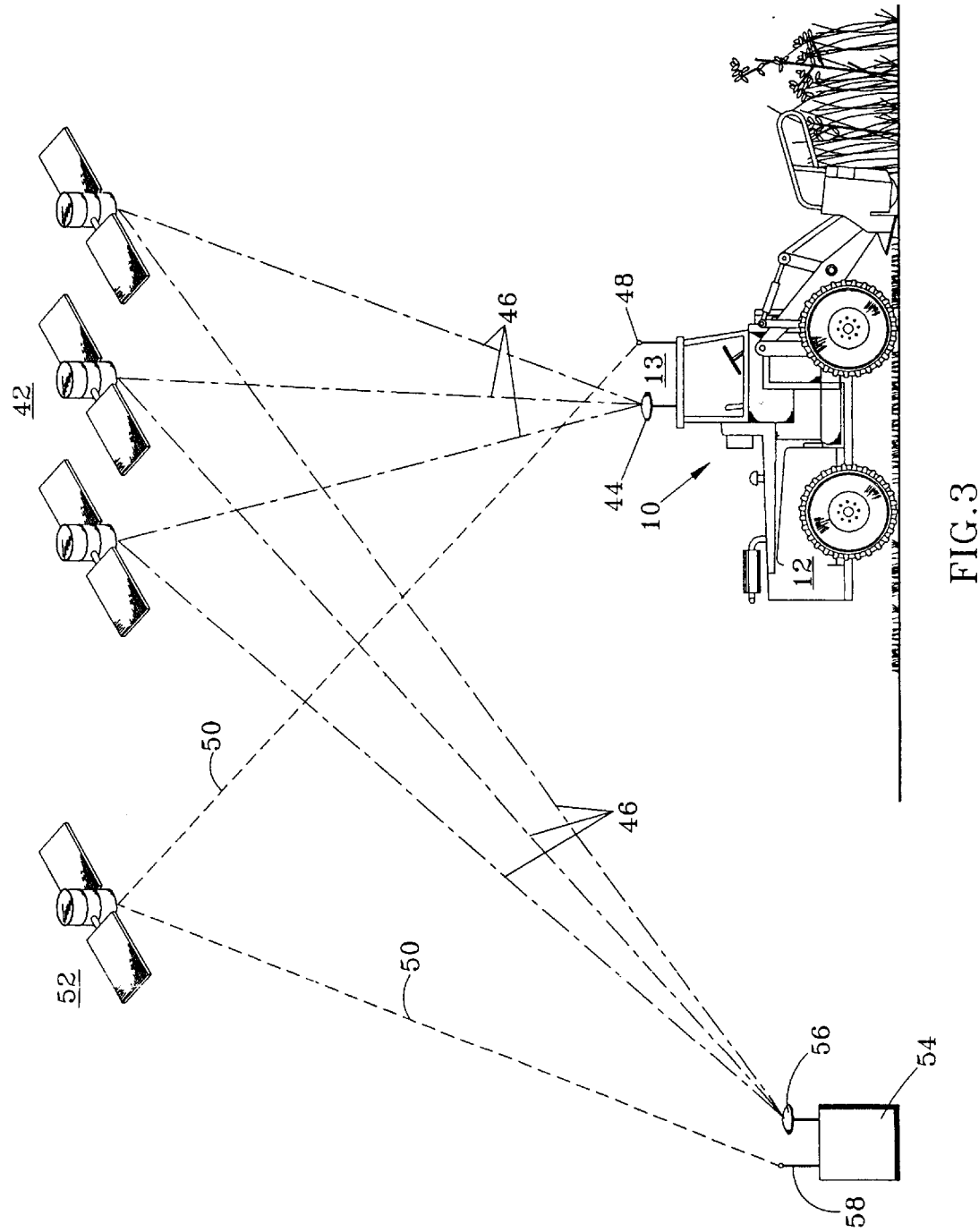
FIG. 3 is a pictorial representation illustrating the operation of the preferred embodiment of the present invention as shown in FIG. 1.
Figure 3A:
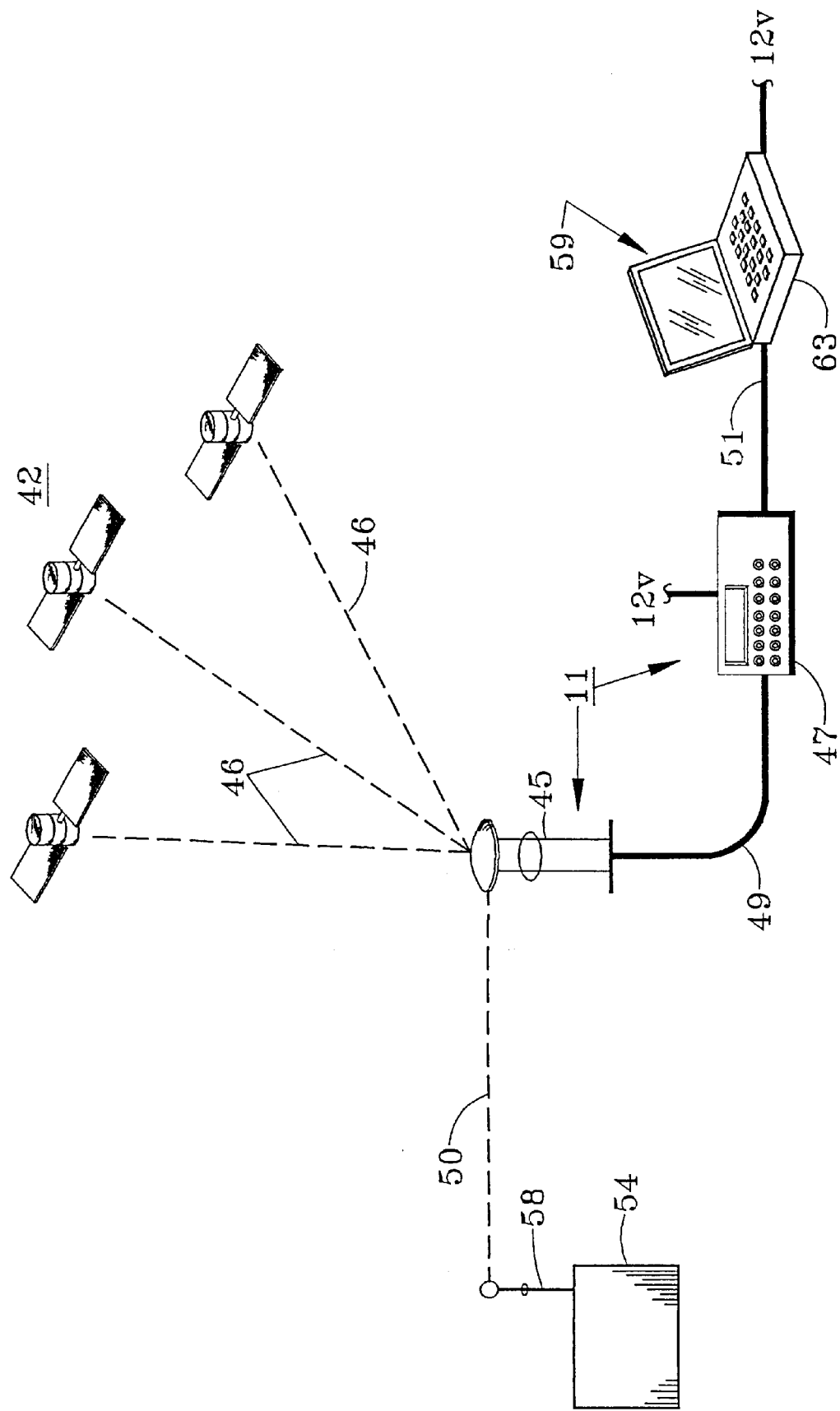
FIG. 3A is a pictorial representation illustrating the operation of an alternate embodiment of the present invention.

Referring now to FIG. 3, a pictorial representation illustrating the operation of a preferred embodiment of the present invention utilizing a guidance satellite network 42 is depicted. The satellite network 42 used in the preferred embodiment remotely guided, brush, cutting, chipping and clearing apparatus 10 may, for example, be the Global Positioning System (GPS) Network, consisting of 24 positioning satellites 42. In the preferred embodiment remotely guided, brush, cutting, chipping and clearing apparatus 10, the vehicle 12 has mounted thereto an apparatus locator system 13 which includes a first satellite receiver antenna 44 for receiving a plurality of satellite network signals 46, sometimes referred to as "tracking" or remote positioning signals 46 and a second radio communication antenna 48 for receiving a differential correction signal 50 which may be transmitted from a communication satellite 52. A single base station 54 may also receive the plurality of satellite network signals 46 at a second satellite receiver antenna 56. The satellite network signals 46 may be received and processed at the base station 54 wherein a differential correction signal 50 is produced. The differential correction signal 50 may then be transmitted from a second radio antenna 58, located at the base station 54 to the communication satellite 52 for transmission to the first radio antenna 48. Alternatively, the base station 54 may also broadcast the differential correction signal 50 from the second radio antenna 58 directly to the first radio antenna 48. With reference to FIG. 3A, where structure similar to that in FIG. 3 is similarly numbered, a dual purpose antenna 45 may be mounted to the vehicle 12 in place of the first satellite receiver antenna 44 and second radio communication antenna 48, to receive both the plurality of satellite network signals 46 and the differential correction signal 50. The dual purpose antenna 45 is preferably in direct signal communication to a GPS signal processing unit 47, for example a Trimble® signal receiver, model no. Ag 120, via a first coaxial cable connection 49, which connects the dual purpose antenna 45 to the GPS signal processing unit 47. Alternatively, an second alternate embodiment apparatus locator system 11 can comprise the dual purpose antenna 45 and the GPS signal processing unit 47. A second cable connection 51 preferably engages the GPS signal processing unit 47 to a data processing unit 63, which also preferably includes a video display. The data processing unit 63 may for example be a COMPAQ® lap top computer, model no. Elite 4/50CX, which is mounted inside the cab 16 of the vehicle 12 and easily accessible to the operator (not shown). The dual purpose antenna 45 receives the plurality of satellite network signals 46 and the differential correction signal 50. These signals 46, 50 are in turn conveyed along the first coaxial cable 49 to the GPS processing unit 47, where the differential correction signal 50 is applied to the calculation of position from the satellite network signals 46, to obtain a corrected actual position of the vehicle 12, relative to the surface of the earth. The corrected position is then relayed to the data processing unit/video display unit 63 via the second connection 51, where the graphic location of the vehicle 12 is displayed by the data processing unit/video display unit 63, relative to a particular line of travel 24.

Figure 5:
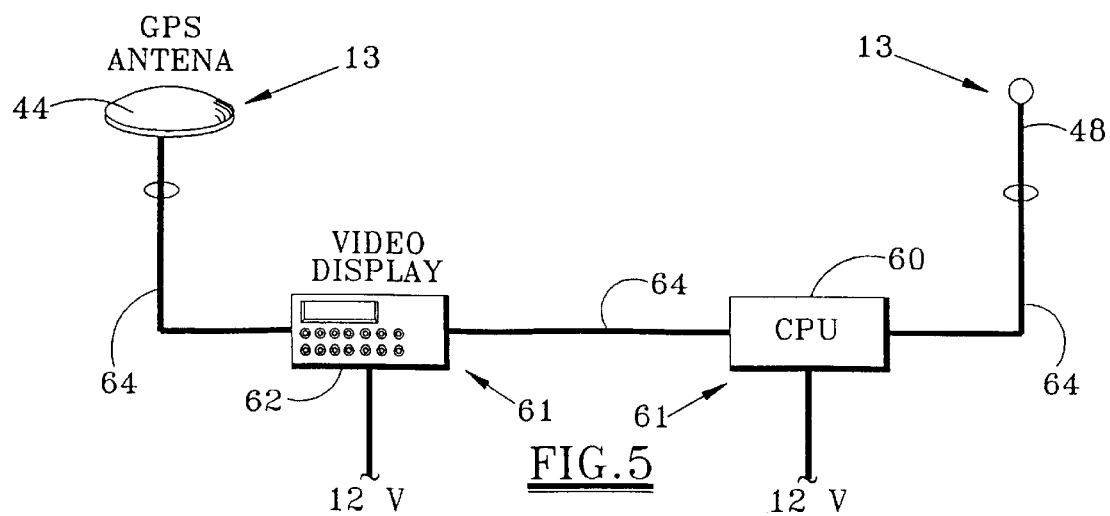
FIG. 5 is a schematic diagram illustrating the operation and relationship between the first satellite antenna, the preferred embodiment guidance system and the second communication antenna of the present invention.
Figure 4:
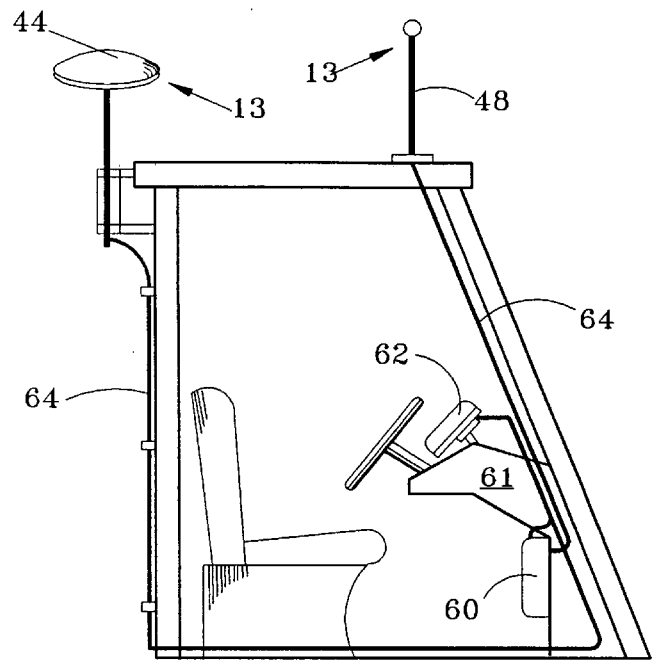
FIG. 4 is detailed side view of a cab interior of the preferred embodiment of the present invention, illustrating the placement of the guidance system.

Referring now to FIGS. 3, 4 and 5 the differential correction signal 50 which is received by the first communication antenna 48 is conveyed to a guidance system 61 mounted to the vehicle 12. The guidance system 61 may, for example, include a data processor 60 and a video display 62. A quantity of data (not shown), including survey coordinates, longitude and latitude coordinates or other survey information describing the desired direction of travel, including property lines, seismic lines, rights-of-way and the like, is preferably input into the data processor 60 and can be viewed on the video display 62. In the preferred embodiment, the data processor 60 may be an on-board central processing unit or personal computer, powered by the DC electrical system of the vehicle 12 (not shown). The first satellite receiver antenna 44 receives the satellite network signals 46 and conveys the signals 46 to the video display 62. The video display 62 may also preferably be powered by the DC electrical system of the vehicle 12 (not shown). The video display 62 then conveys the satellite network signals 46 to the data processor 60, wherein the satellite network signals 46 are corrected using the differential correction signal 50. The data processor 60 then transmits the corrected network signals 46 back to the video display 62, wherein the location of the vehicle 12, relative to the surface of the earth, is displayed on the video display 62 and, additionally the desired direction of travel of the vehicle 12 relative to the survey coordinates of the property line, seismic line, right-of-way and the like, may also be displayed on the video display 62. The satellite network signals 46 and the differential correction signal 50 are preferably communicated over a length of coaxial cable 64 disposed between and engaging the first satellite antenna 44 and the first communication antenna 48 to the guidance system 61.

With reference now to FIGS. 3, 3A, 4 and 5, the operator (not shown) can view the video display 62 or data processor video display 63 to determine the location of the vehicle 12 and can simultaneously make steering corrections, via the steering means 18, to maneuver the vehicle 12 to achieve and maintain the desired direction of travel. In this manner, the vehicle 12 is remotely guided using the satellite network signals 46 and the differential correction signal 50 to precisely travel in a desired direction, easily locating intangible boundaries and paths such as property lines, seismic lines, rights-of-way and the like while cutting, chipping and clearing brush, in the absence of using slow, labor intensive and expensive traditional surveying methods and in the absence of creating permanent environmental and soil erosion concerns.

The above described guidance satellite system 42 yields extremely accurate remote positioning data where the satellite network signals 46 can be received by the satellite receiver antennae 44, 56 and where the differential correction signal 50 can be relayed to the first communication antenna 48. However, in areas where the satellite network signals 46 can not be received, such as for example in areas where there is a thick vegetation "canopy," i.e. swamps, jungles and thick forests, an alternative apparatus locator system must be employed to remotely guide the brush cutting, chipping and clearing apparatus 10.

Figure 6:
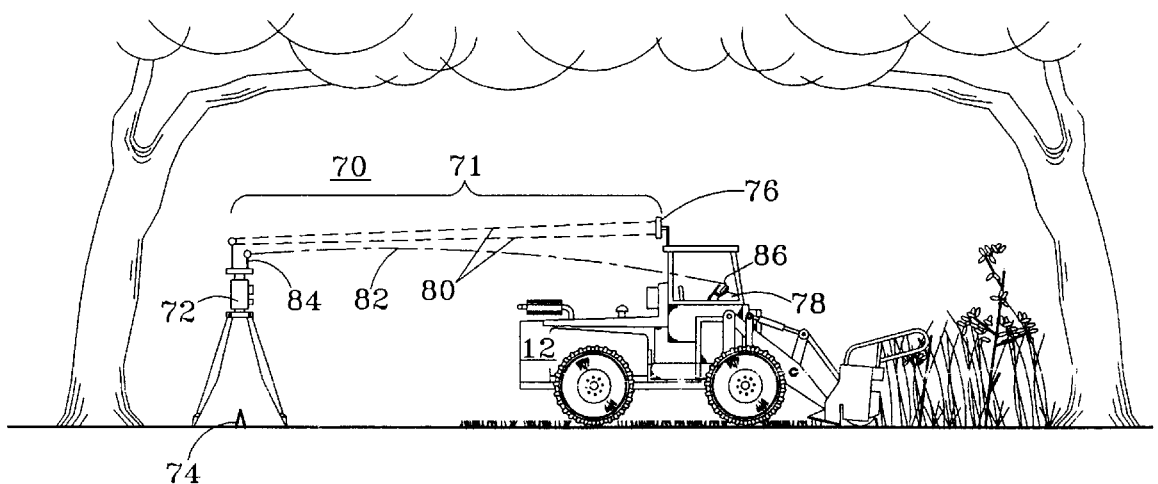
FIG. 6 is a pictorial representation illustrating the operation of an alternate embodiment of the present invention utilizing a geodetic survey apparatus locator system.

With reference now to FIG. 6, an alternate embodiment apparatus locator system 70 for remotely guiding an apparatus 10, dependent upon remote positioning data and radio communication signals, for cutting, chipping and clearing brush is depicted. The alternate embodiment apparatus locator system 70, may for example be a semi-automated geodetic survey system 71. The semi-automated geodetic survey system 71 may, for example, may be a Geodimeter® System 4000 geodetic survey system. The preferred embodiment semi-automated survey system 71, preferably consists of a transportable station unit 72, positioned at a known point 74 and a mobile reflector 76, preferably mounted to the apparatus 10. A guidance system 78, having an internal data processor, a video display and a first radio antenna (not shown) is also mounted to the apparatus 10 and is in signal communication with the station unit 72. The station unit 72 continuously conveys a laser signal 80 to the reflector 76. The laser signal 80 is then reflected back to the station unit 72 and measurement data is obtained from the reflected laser signal 80 and is collected at the station unit 72. The guidance system 78, may preferably be affixed directly to the reflector 76 or may be mounted adjacent to the reflector 76. The reflector 76 may be affixed to a movable object such as the apparatus 10 or a hand held rod (not shown). The laser signal 80 is processed at the station unit 72, wherein a radio signal 82, containing the measurement information is created. The radio signal 82 is broadcast from a first radio antenna 84 to a second radio antenna 86 which is in communication with the guidance system 78. The radio signal 82 is processed by the guidance system 78, wherein the apparatus 10 location and the desired direction of travel is visually displayed by the guidance system 78 thus informing the operator (not shown) as to the location of the apparatus 10 with respect to the surface of the earth and illustrating the desired direction of travel.

Figure 7:
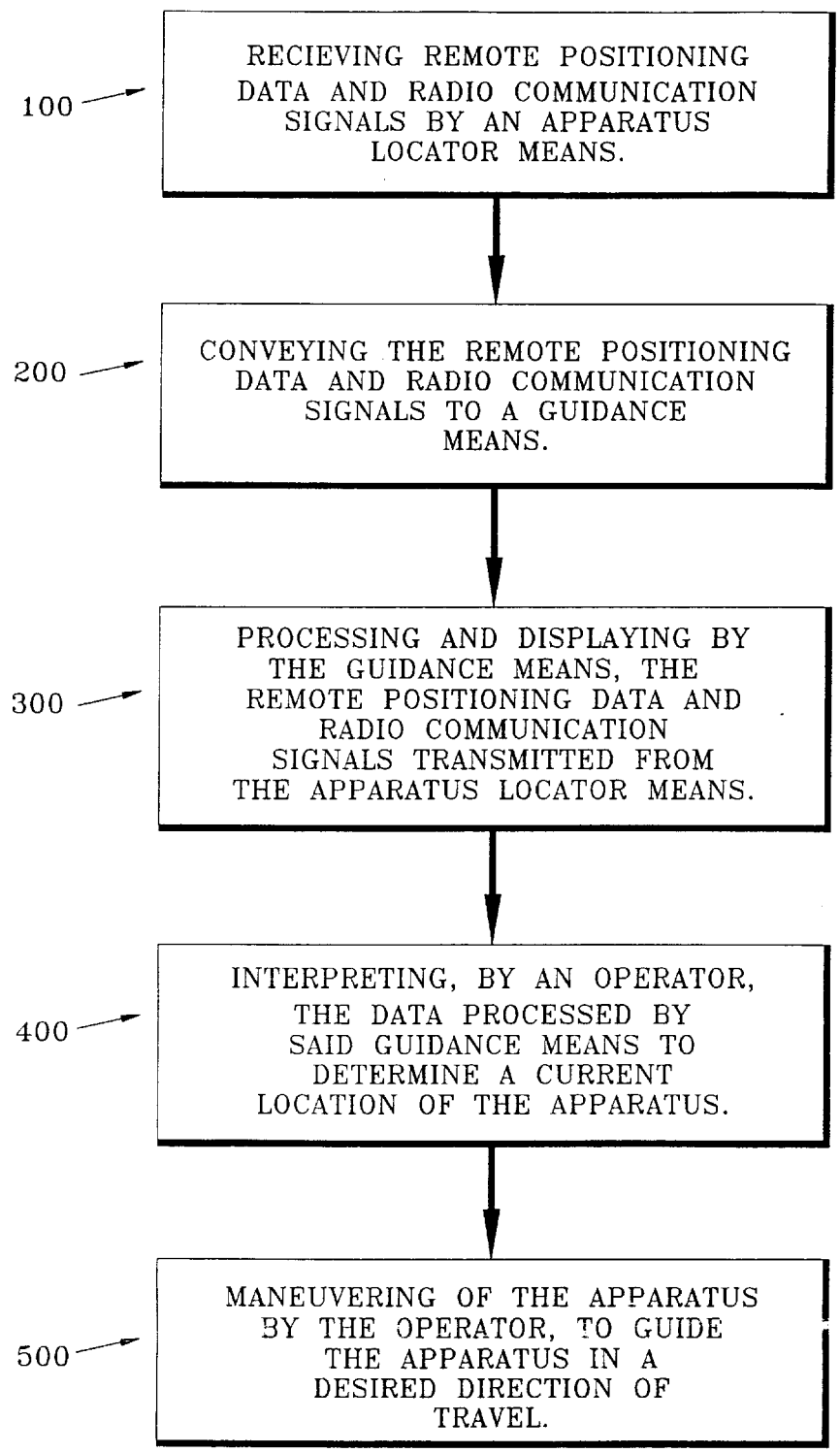
FIG. 7 is a block diagram depicting a preferred method of remotely guiding a brush cutting, chipping and clearing apparatus.

With reference to FIG. 7, a block diagram depicting a preferred method for using the remotely guided brush cutting, chipping and clearing apparatus 10, dependent upon remote positioning data and radio communication signals, having an apparatus locator system 13, 70 for determining the location of the apparatus 10 and the desired direction of travel for the apparatus 10, relative to the surface of the earth is presented. The method preferably includes the steps of: receiving 100 by an apparatus locator system 11, 13, 70 the remote positioning data 46, 80 and radio communication signals 50; conveying 200 the remote positioning data 46, 80 and radio communication signals 50 to a guidance system 59, 61, 78; processing and displaying 300 by the guidance system 59, 61, 78 the remote positioning data 46, 80 and radio communication signals 50 transmitted from the apparatus locator system 11, 13, 70; interpreting 400, by an operator (not shown), the data processed by the guidance system 59, 61, 78 to determine a current location of the apparatus 10 with respect to the surface of the earth; and maneuvering 500 the apparatus 10, by the operator, to guide the apparatus 10 in a desired direction of travel.

Figure 8:
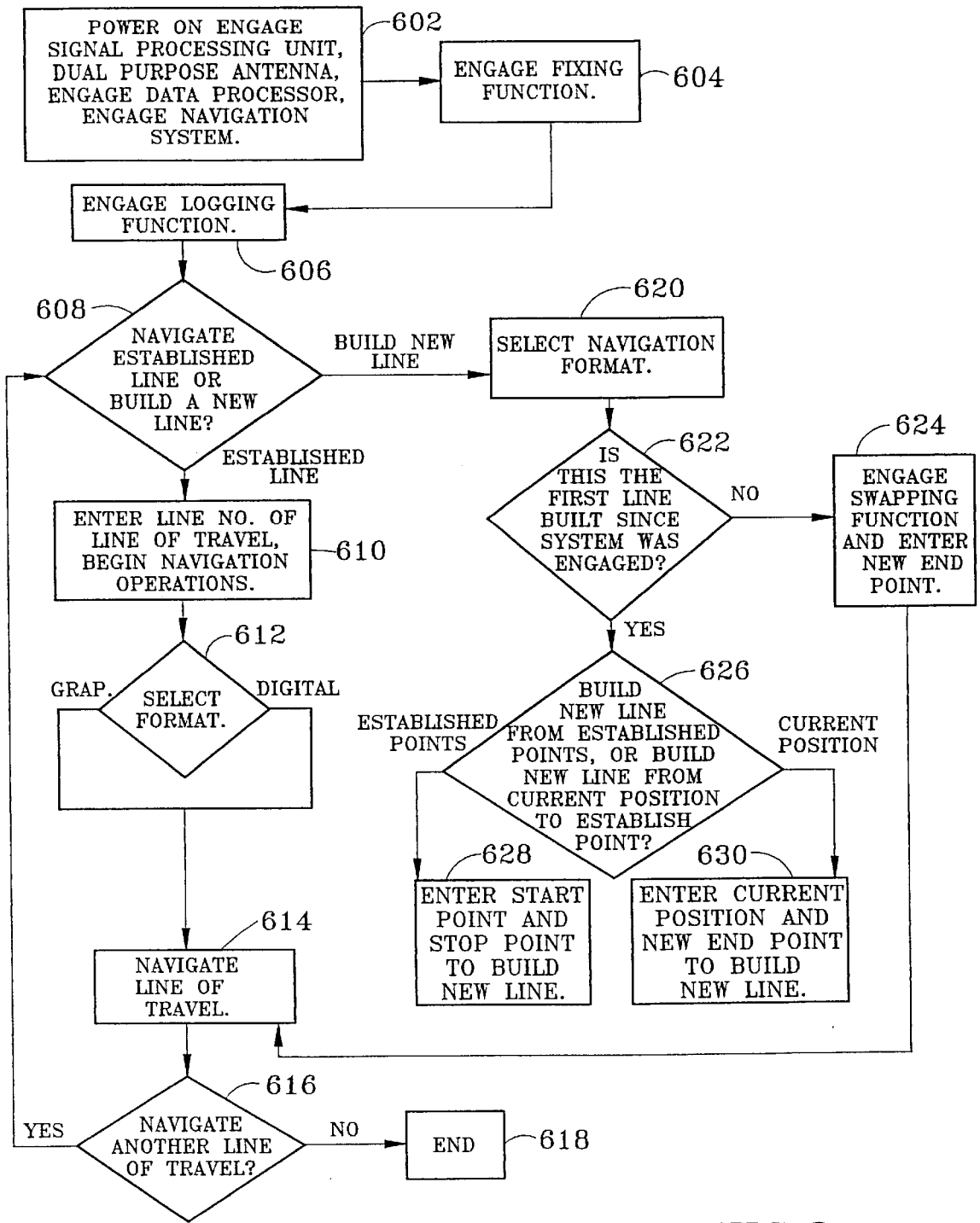
FIG. 8 is a block diagram illustrating a preferred method of navigating the remotely guided brush cutting, chipping and clearing apparatus.
Figure 10:
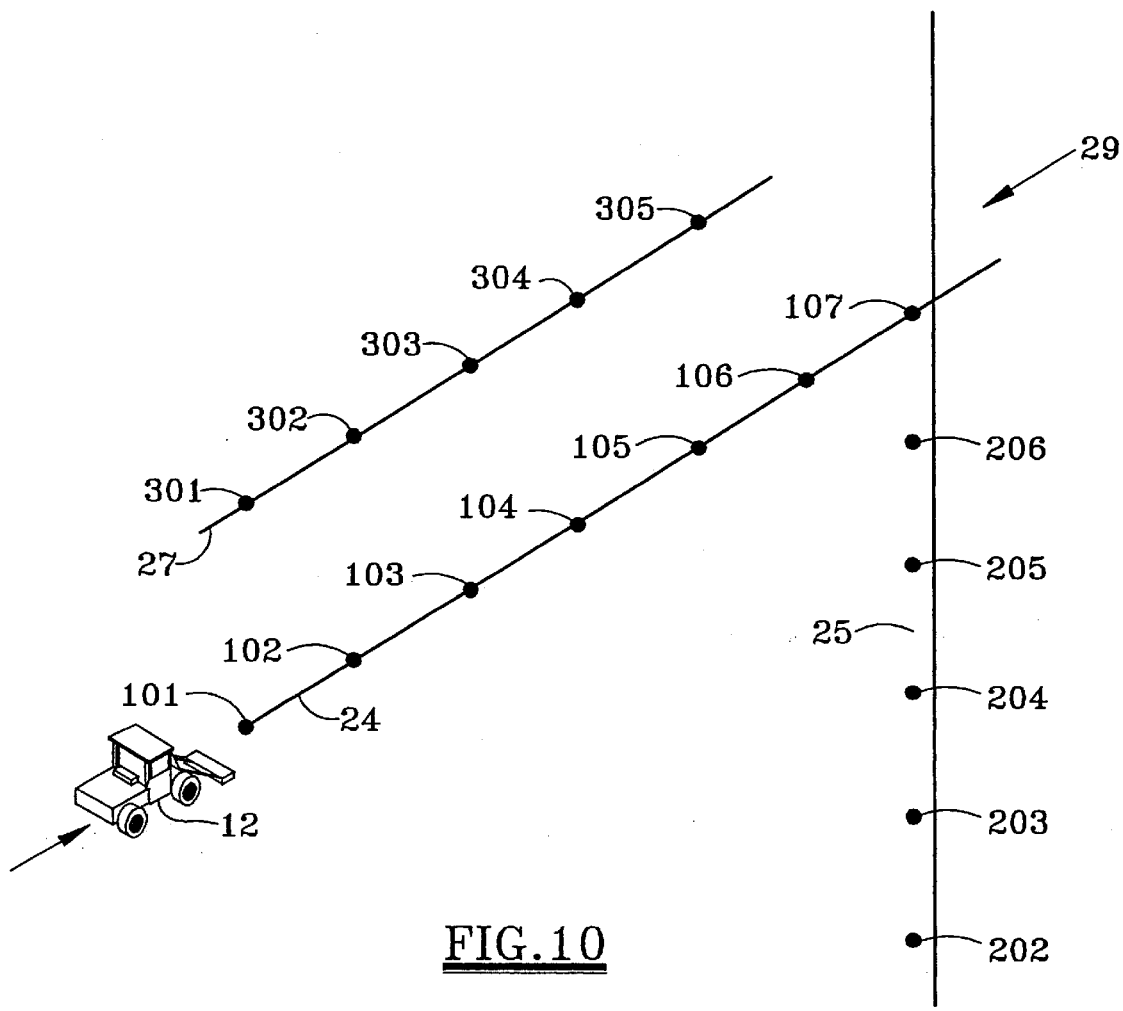
FIG. 10 is a top view, graphic representation of the vehicle navigating along various lines of travel and a plurality of specific data points located on the lines of travel.

With reference generally to FIGS. 1–7, and specifically to FIGS. 8 and 10, structure in FIGS. 8 and 10 which is similar to structure in FIGS. 1–7 is similarly numbered, a preferred method 600 for navigating the apparatus 10 along exact points 101, 102, 103, 104, 105, 106, 107 of a particular line of travel 24, is illustrated. As discussed above, the data processor 63, 60 is preferably mounted on the apparatus 10 and is in electrical communication with, and empowered by, an on board power source (not shown) which provides energy to propel the apparatus 10. The data processor 63, 60 also preferably includes a navigation system 600, which may for example be navigational software which interfaces with the GPS navigational satellite network 42. A second alternate embodiment apparatus guidance system 59 may comprise the data processor video display 63 and the navigational system 600 contained within the data processor video display 63. By way of example, the navigation system 600 may comprise navigational computer software licensed and distributed by Terra Services, Inc., under the GATOR-TRAC$^{SM}$ service mark. When the signal processing unit 47, the dual purpose antenna 45, the data processor 63, 60 is switched on or engaged 602, the navigational system 600 becomes accessible to the operator (not shown) and a variety of initial messages may be displayed on the data processor 63, 60. The initial messages displayed on the data processor 63, 60 may include, but are not limited to, identifying the serial port (not shown) which is currently in use by the data processor 63, 60, and may also illustrate a menu (not shown) of the various functions of the navigation system 600. Next, a fixing function 604 of the navigation system 600 is activated to determine an initial point number 101 on the initial line of travel 24, to determine the present location of the apparatus. The fixing function 604 performs the step of searching for the next point number 102 along the line of travel 24 to maintain a planned or sequential progression along the line of travel 24. The fixing function 604 can determine the navigational coordinates of the apparatus and/or beginning navigation position in terms of the particular line number and specific point number, i.e., line number 24, point number 101 (024101); latitude and longitude coordinates (not shown); and/or easting and northing coordinates (not shown). Preferably, the navigational coordinates are in a format consistent with the North American Dimension (NAD) 27 State Plane Grid, which is recognized as an accepted standard in the seismic and navigation industry. Additionally, the line number of the particular line of travel 24 and specific point numbers 101, 102, 103, 104, 105, 106, 107 along the line of travel 24 to be traversed by the apparatus 10, are preferably provided in a particular format known in the seismic industry as a "SEG P1" file (not shown). "SEG" is an abbreviation derived from the term "Society of Exploration Geophysicists." The SEG P1 file (not shown) consists of a specific set of navigation coordinates to be traversed by the apparatus 10, which are arranged in an industry standard digital, columnar manner, which can be uniformly down loaded into the data processor 63, 60 to easily interface with the navigation system 600. The SEG P1 file (not shown) generally provides specific navigation information for the particular line of travel 24 and the specific data point numbers 101, 102, 103, 104, 105, 106, 107 along the particular line of travel 24, the longitude and latitude coordinates, and the easting and northing coordinates to be traversed by the apparatus 10. The SEG P1 file (not shown) is preferably down loaded into the data processor 63, 60 prior to commencing the navigation system 600. After the fixing function 604 has been engaged, a logging or recording function 606 may selectively be activated. Activation of the logging function 606 records the location of the data points 101, 102, 103, 104, 105, 106, 107 along the particular line 24 traversed by the apparatus 10, for the purpose of constructing a map or plot 29, illustrated in FIG. 10, of the points 101, 102, 103, 104, 105, 106, 107 traversed by the apparatus 10. The logging function 606 will be discussed below in reference to FIG. 8. After deciding whether to activate the logging function 606, a decision step 608 must be made whether to navigate the apparatus 10 along an established or previously computed line 24 previously entered into the data processor 63, 60, or to construct a new line 25 using the information contained in the SEG P1 file or from coordinates in the data processor 63, 60. If navigation of the apparatus 10 is to take place along a previously established line of travel 24, the operator (not shown) inputs a selection accordingly into the data processor 63, 60. Alternatively, the operator (not shown) may select, using the data processor 63, 60, to construct or build a new line of travel 25. If the operator (not shown) selects 610 an established line of travel 24 to navigate along, the operator (not shown) enters the particular line number 24. The operator (not shown) thereafter selects a navigational format 612 to be displayed on the video display 62 and/or the data processor 63. The operator (not shown) may select either a graphic representation similar to that shown in FIG. 10, where the apparatus 10 is displayed along the line of travel 24, wherein travel along the line of travel 24 and divergence from the line of travel 24 is depicted in a pictorial format, or the operator (not shown) may select a digital format (not shown) which displays numerical distance measurements between specific points 101, 102, 103, 104, 105, 106, 107 along the line of travel 24 and numerical distance measurements between the apparatus 10 and the line of travel 24 in generally accepted units of measurement, i.e. linear feet, yards, meters, etc. Once the navigational format 612 has been chosen, the operator (not shown) navigates 614 along the particular line of travel 24 and specific points 101, 102, 103, 104, 105, 106, 107 along the line of travel 24. At the completion of the navigation step 614, the operator (not shown) may selectively navigate 616 another line of travel 25 or end navigation operations 618. If at the decision step 608, the operator (not shown) decides to build a new line of travel 25, the operator (not shown) must select a navigation format 620 of either a digital or graphic display, as previously explained at step 612. After the navigation format is selected in step 620, the operator (not shown) is asked 622 whether the new line of travel 25 to be traversed is the first line constructed since the navigation system 600 has become engaged 602. Step 622 decides whether to engage a swapping function 624 used to assist in navigating a secondary or additional lines of travel (not shown). If at step 622, the operator (not shown) is then navigating a second or later line of travel 25 with respect to step 602, the swapping function 624 can be engaged and the last point 107 traversed on the previous line of travel 24, now becomes the starting point 107 in the new line of travel 25. Additionally, when the swapping function 624 is engaged, the operator (not shown) enters a new end point 202, and new line number 25, if necessary, and navigation of the new line 25 takes place at step 614. If at step 622, the operator (not shown) desires to construct and navigate a first line of travel 24 since the navigation system 600 was engaged at step 602, the operator (not shown) enters the selection into the data processor 63, 60, accordingly. After the decision is made in step 622, the operator (not shown) must again make a selection at step 626, whether to build a new line of travel 27 from established points, not inclusive of the operator's current position or build a new line 25 beginning from the operator's current position and terminating at a new end point 202. Depending on the operator's decision in step 626, the operator (not shown) may advance to step 628 and enter an established start point 301 and line number 27 and an established stop point 305 and line number 27 to build a new line 27 separate from the present location of the apparatus 10. The operator (not shown) then travels to the established start point 301 and traverses the apparatus 10 along the new line of travel 27. Alternatively, the operator (not shown) can proceed from step 626 to step 630 if the operator (not shown) desires to begin navigation on a new line of travel 25 beginning at the current location 107 of the apparatus 10 and ending at a known end point 202. In this manner, the operator (not shown) enters the location coordinates of the present location of the apparatus 10 and the terminal point 202 to be traversed and a new line 25 is graphically or digitally displayed on the video display 62 and/or the data processor 63. At the conclusion of step 628 and step 630, the line of travel 24 is then navigated 614 and the apparatus 10 generally traverses the line of travel 24 created by the data processor 63, 60. At the conclusion of the navigation step 614, the operator (not shown) has the opportunity to navigate 616 an additional line of travel 25, 27 or to end 618 navigation operations.

Figure 9:
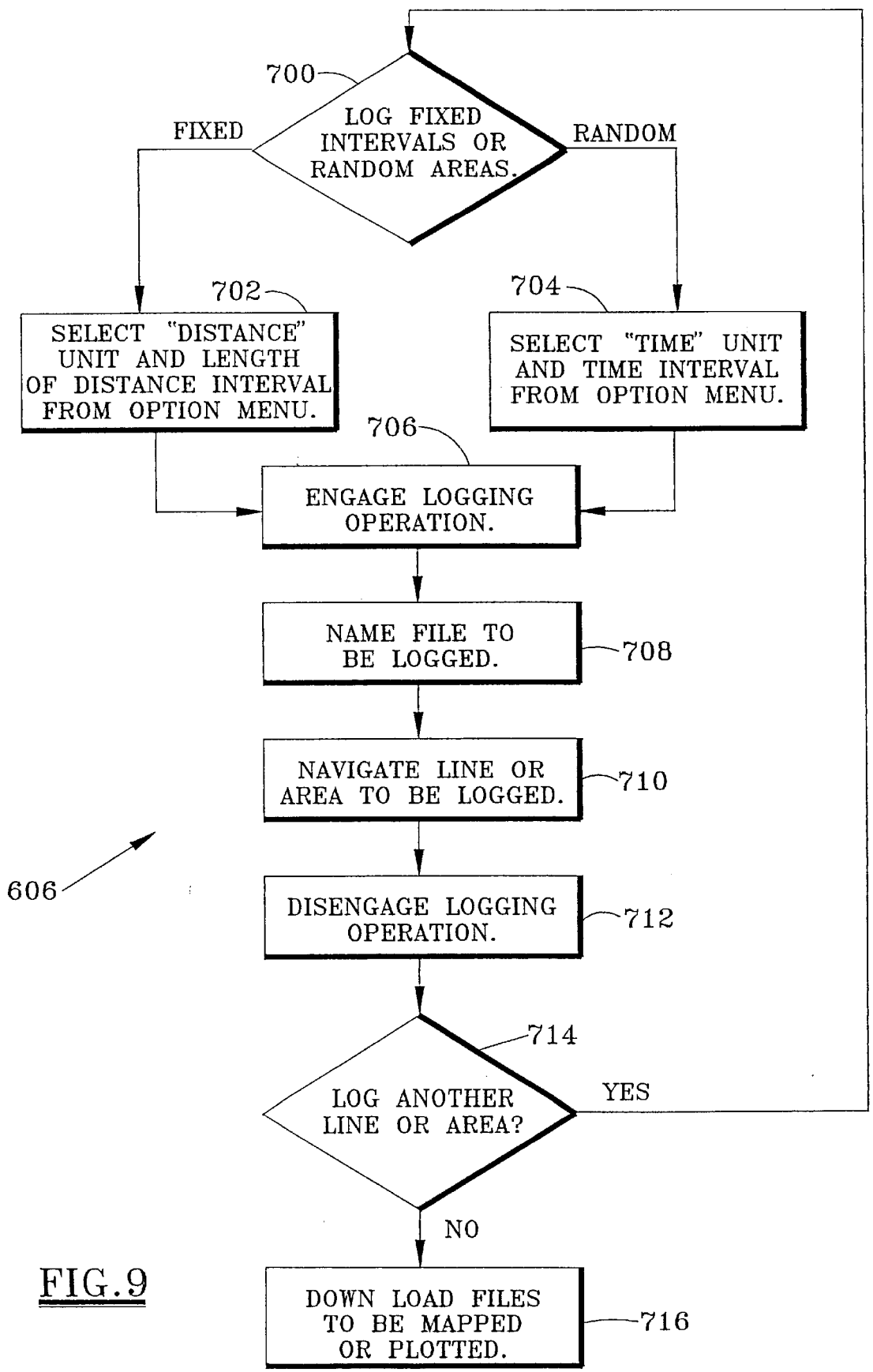
FIG. 9 is a block diagram illustrating a preferred method of logging the specific data points of a particular line of travel, navigated by the remotely guided brush cutting, chipping and clearing apparatus.

Referring now to FIG. 9 and FIG. 10, the logging or data recordation function 606 is illustrated in greater detail. As briefly discussed above, the logging function 606 creates a data record (not shown) of the navigational points 101, 102, 103, 104, 105, 106, 107 and line of travel 24 actually traversed by the apparatus 10, which can be used to create a map or plot 29 of the line 24 and data points 101, 102, 103, 104, 105, 106, 107 traversed by the apparatus 10. The data points 101, 102, 103, 104, 105, 106, 107 may for instance represent the drillsite locations, shot or vibration locations, and/or the geophone locations for use in seismic mapping. The map or plot 29 created by the logging function 606 may also be used by planners and developers of the land. The logging function 606, if engaged, allows the operator (not shown) to record or log 700 the specific location of the data points 101, 102, 103, 104, 105, 106, 107 traversed along on the particular line of travel 24 traversed by the apparatus 10, in selectively, fixed units of linear measurement 702 between successive data points on the line of travel 24. Alternatively, the operator (not shown) may record or log the data points 101, 102, 103, 104, 105, 106, 107 traversed along the line of travel 24, in a random manner according to the passage of fixed units of time 704 measured between successive data points 101, 102, 103, 104, 105, 106, 107 on the line of travel 24. The operator (not shown) in step 702 selects the fixed linear measurement unit, i.e., feet, yards, meters, miles, etc., and may also select the actual measured distance, i.e., 10 feet, 100 yards, 50 meters, etc., from the options menu of the navigation system 600 to be measured between successive data points 101, 102, 103, 104, 105, 106, 107 along the line of travel 24. The operator (not shown) in step 704 selects the specific unit of time measurement, i.e., second, minute, hour, etc. and the specific time interval, i.e., 30 seconds, 5 minutes, 1 hour, etc., from the options menu of the navigational system 600, to record the time interval which passes between random successive data points (not shown) traversed along a path (not shown) in a random manner. Having selected the measurement format in step 702 or step 704, the operator (not shown) engages the logging function 706 and begins recording the actual data points 101, 102, etc. traversed by the apparatus 10. After the logging or recordation function 706 has commenced, the operator (not shown) may preferably enter the name of the particular traversal 708 into the data processor 60, to easily identify and access the recorded information. The operator (not shown) and apparatus 10 then traverse 710 the particular line or travel 24 to be logged as discussed in step 614, or FIG. 8, above. The logging function 706 is disengaged 712 once the apparatus 10 has completed traversing the data points 106, 107 of the particular line of travel 24. After the logging operation 706 has become disengaged 712, the operator (not shown) may log 714 an additional line of travel 25, 27 by returning to step 700, or can alternatively, down load 716 the logged or recorded line(s) of travel 24 and data points 101, 102, 103, 104, 105, 106, 107 for use in creating a map or plot 29 of the area traveled or covered by the apparatus 10.

It will be appreciated that these and other embodiments may be provided to navigate a remotely guided brush cutting, chipping and clearing apparatus, dependent upon remote positioning data and radio communication signals, having an apparatus locator means for determining the location of the apparatus and a guidance means for displaying the desired direction of travel for the apparatus, relative to the surface of the earth. Additional embodiments become readily apparent in view of the present invention as described herein above. Having described the invention above various modifications of the techniques, procedures and materials will be apparent to those skilled in the art. It is intended that all such variations within the scope and spirit of the appended claims be embraced thereby.

What is claimed is:

1. A remotely guided brush cutting, chipping and clearing apparatus, dependent upon remote positioning data and radio communication signals, comprising:

a wheeled vehicle;

a hydraulic support system and a rotational power supply mounted to said vehicle;

a cutting head for cutting, chipping and clearing brush and trees, said cutting head being mounted to said hydraulic support system and engaged to said rotational power supply;

an apparatus locator means mounted to said vehicle for receiving the remote positioning data and the radio communication signals, wherein said apparatus locator means comprises a dual purpose antenna and a signal processing unit for receiving the remote positioning data and for receiving the radio communication signals; and a guidance means mounted to said vehicle and in signal communication with said apparatus locator means, for continuously reading and processing the remote positioning data and the radio communication signals to determine an instantaneous location of the vehicle relative to the surface of the earth and, in response thereto, to guide the vehicle for movement in a desired direction and to assist the vehicle in maintaining travel in the desired direction and returning the vehicle to the desired direction.

2. The remotely guided brush cutting, chipping and clearing apparatus, dependent upon remote positioning data and radio communication signals, as defined in claim 1, wherein said apparatus guidance means comprises a data processor and navigation system, wherein the data processor further includes a video display, said data processor being mounted to said vehicle and in signal communication with said dual purpose antenna and said signal processing unit.

3. The remotely guided brush cutting, chipping and clearing apparatus, dependent upon remote positioning data and radio communication signals, as defined in claim 1, wherein the remote positioning data comprises a plurality of signals emitted by the Global Positioning System satellite network.

4. The remotely guided brush cutting, chipping and clearing apparatus, dependent upon remote positioning data and radio communication signals, as defined in claim 1, wherein the radio communication signals comprise a plurality of correction signals emitted by a base station.

5. The remotely guided brush cutting, chipping and clearing apparatus, dependent upon remote positioning data and radio communication signals, as defined in claim 2, wherein said data processor comprises a central processing unit to continuously process the remote positioning data and radio communication signals and a video display screen to display a current position of the apparatus relative to the surface of the earth and the desired direction of travel for the apparatus, to guide the apparatus for movement in the desired direction and to assist the vehicle in maintaining travel in the desired direction and returning the vehicle to the desired direction.

6. A method of navigating a remotely guided brush cutting, chipping and clearing apparatus, dependent upon remote positioning data and radio communication signals, comprising the steps of:

engaging an apparatus locator means for locating the position of the apparatus and engaging an apparatus guidance means for navigating the apparatus, wherein said apparatus locator means is in signal communication with said apparatus guidance means and said apparatus locator means and said apparatus guidance means are in communication with the remote positioning data and radio communication signals, said apparatus locator means and said apparatus guidance means being mounted on the remotely guided brush cutting, chipping and clearing apparatus;

selecting via the apparatus guidance means, a particular line of travel and a plurality of specific data points located on the line of travel, along which to navigate the remotely guided brush cutting, chipping and clearing apparatus;

inputting in the apparatus guidance means, a starting data point from which to begin navigating the remotely guided brush cutting chipping and clearing apparatus and an end data point on which to terminate navigation of the remotely guided brush cutting, chipping and clearing apparatus on the particular line of travel;

selecting a visual display format on the apparatus guidance means, from which an operator can interpret and control the navigation of the remotely guided brush cutting, chipping and clearing apparatus;

navigating by the operator, the remotely guided brush cutting, chipping and clearing apparatus, via the apparatus locator means and the apparatus guidance means, along the plurality of points of the selected line of travel, while cutting, chipping and clearing brush; and providing for the input of additional lines of travel and additional data points along said additional lines of travel, in the apparatus guidance means.

7. The method of navigating a remotely guided brush cutting, chipping and clearing apparatus, dependent upon remote positioning data and radio communication signals, as defined in claim 6, wherein said apparatus locator means comprises a dual purpose antenna and a signal processing unit for receiving the remote positioning data and for receiving the radio communication signals.

8. The method of navigating a remotely guided brush cutting, chipping and clearing apparatus, dependent upon remote positioning data and radio communication signals, as defined in claim 6, wherein said apparatus guidance means includes a data processor and a navigation system.

9. The method of navigating a remotely guided brush cutting, chipping and clearing apparatus, dependent upon remote positioning data and radio communication signals, as defined in claim 8, wherein the data processor of said apparatus guidance means further comprises a visual data display.

10. The method of navigating a remotely guided brush cutting, chipping and clearing apparatus, dependent upon remote positioning data and radio communication signals, as defined in claim 6, wherein the remote positioning data comprises a plurality of signals emitted by the Global Positioning System satellite network.

11. The method of navigating a remotely guided brush cutting, chipping and clearing apparatus, dependent upon remote positioning data and radio communication signals, as defined in claim 6, wherein the radio communication signals comprise a plurality of correction signals emitted by a base station.

12. A method of navigating a remotely guided brush cutting, chipping and clearing apparatus, dependent upon remote positioning data and radio communication signals, comprising the steps of:

engaging a signal processing unit, a dual purpose antenna, a data processor and a navigation system, all being mounted on the apparatus and in communication with the remote positioning data and radio communication signals, wherein said data processor further includes a visual data display;

engaging a logging function within the navigation system to record the location coordinates of a plurality of data points along a desired line of travel;

selecting on said data processor and navigation system, a line of travel to navigate the apparatus;

inputting in the data processor and navigation system, a starting point from which to begin navigation the apparatus, a starting line of travel, a plurality of data points on the starting line of travel, and an end data point on the starting line of travel, on which to navigate the apparatus;

selecting a visual display format on the data processor, from which an operator can interpret and control the navigation of the apparatus;

navigating the vehicle, by the operator, along the plurality of points of the selected line of travel; and selectively providing for the input of additional lines of travel and a plurality of additional points along said additional lines of travel, to enable the apparatus to navigate additional lines of travel.

13. The method of navigating a remotely guided brush cutting, chipping and clearing apparatus, dependent upon remote positioning data and radio communication signals, as defined in claim 12, wherein the remote positioning data comprises a plurality of signals emitted by the Global Positioning System satellite network.

14. The method of navigating a remotely guided brush cutting, chipping and clearing apparatus, dependent upon remote positioning data and radio communication signals, as defined in claim 12, wherein the radio communication signals comprise a plurality of correction signals emitted by a base station.

15. The method of navigating a remotely guided brush cutting, chipping and clearing apparatus, dependent upon remote positioning data and radio communication signals, as defined in claim 12, wherein the logging function records the location coordinates of the plurality of data points along a desired line of travel, according to a uniform length of distance between successive data points.

16. The method of navigating a remotely guided brush cutting, chipping and clearing apparatus, dependent upon remote positioning data and radio communication signals, as defined in claim 12, wherein the logging function records the location coordinates of the plurality of data points along a desired line of travel, according to a uniform time interval traveled between successive data points.

17. The method of navigating a remotely guided brush cutting, chipping and clearing apparatus, dependent upon remote positioning data and radio communication signals, as defined in claim 12, wherein the location coordinates of the plurality of data points, as recorded by the logging function, are used to create a map of an area covered by the apparatus.

\* \* \* \* \*